March 15, 1960

C. H. FRIDAY 2,928,318

REMOTE CONTROLLED REAR VIEW MIRROR

Filed April 2, 1956

Charles H. Friday
INVENTOR.

BY
Attorneys

March 15, 1960
C. H. FRIDAY
2,928,318
REMOTE CONTROLLED REAR VIEW MIRROR
Filed April 2, 1956
2 Sheets-Sheet 2
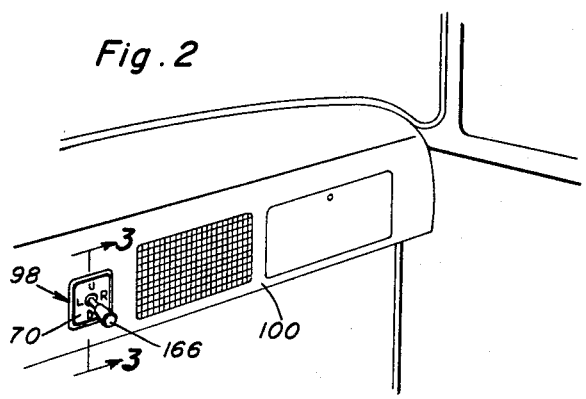
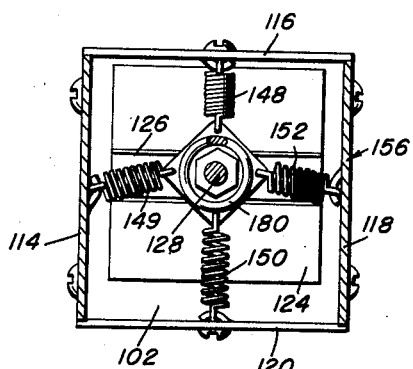
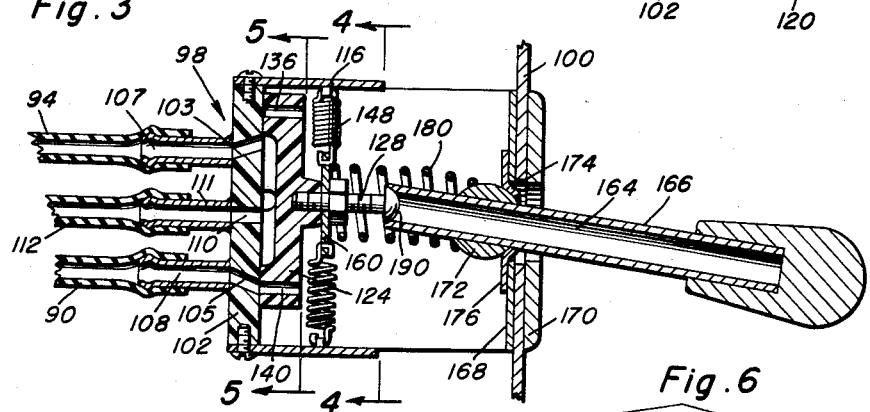
Charles H. Friday
INVENTOR.
BY

United States Patent Office 2,928,318
Patented Mar. 15, 1960

2,928,318

REMOTE CONTROLLED REAR VIEW MIRROR

Charles H. Friday, Roseburg, Oreg., assignor of one-half to Jesse M. Housley, Milwaukee, Oreg.

Application April 2, 1956, Serial No. 575,398

4 Claims. (Cl. 88—93)

This invention relates to automotive accessories and particularly to a mirror which is controllable from the interior of the motor vehicle.

An object of the present invention is to provide an improved automotive accessory that may be installed as original equipment on the motor vehicle or which may be subsequently installed after the purchase of the vehicle, the accessory being a mirror which is adjustable from the interior of the motor vehicle by movement of a small handle in the direction or a corresponding direction of movement of the mirror.

Another object of the invention is to provide a practical device of this nature which uses engine vacuum for tilting a lever or arm that is fixed to the mirror, this tilting movement being accompanied by corresponding tilting movement of the mirror that is attached thereto.

A further object of the invention is to provide improvements in adjustable mirrors by mechanically simplifying a system that relies on vacuum as a motive fluid, this mechanical simplification being such that only a single line from a source of vacuum, as the intake manifold, is used for actuating one of a selected series of fluid motors that are arranged in quadrature about the mirror moving arm.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a fragmentary view of the interior of the motor vehicle showing the control for the mirror, this control being also located in one of a number of acceptable positions in the motor vehicle;

Figure 3 is an enlarged sectional view taken on the line 3—3 of Figure 2;

Figure 4 is a transverse sectional view taken on the line 4—4 of Figure 3;

Figure 5 is a transverse sectional view taken on the line 5—5 of Figure 3 and showing particularly the valve for controlling the actuation of the fluid motors in the accessory;

Figure 6 is an exploded perspective view of the valve of Figure 3;

Figure 1:
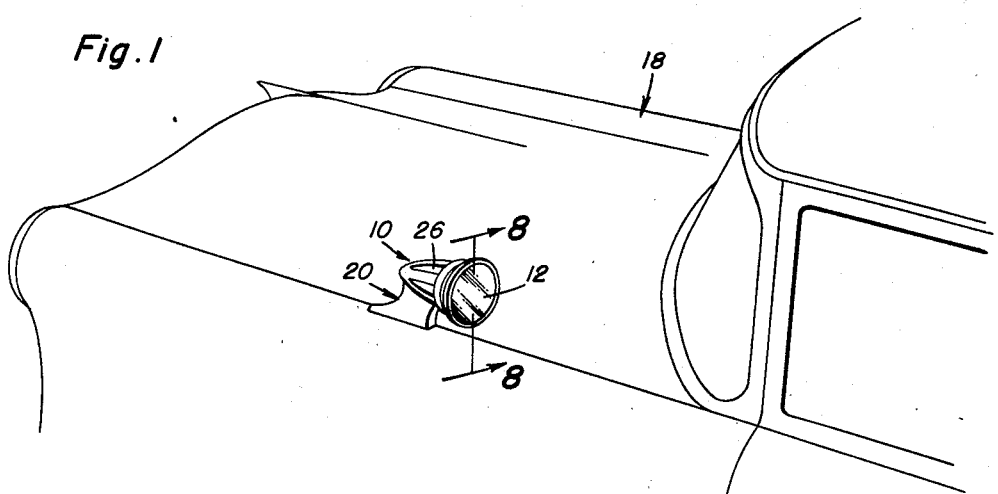
Figure 1 is a fragmentary perspective view of a motor vehicle having an automotive accessory mounted thereon that is made in accordance with the principles of the invention and demonstrating but one of a large number of possible locations for the accessory.
Figure 7:
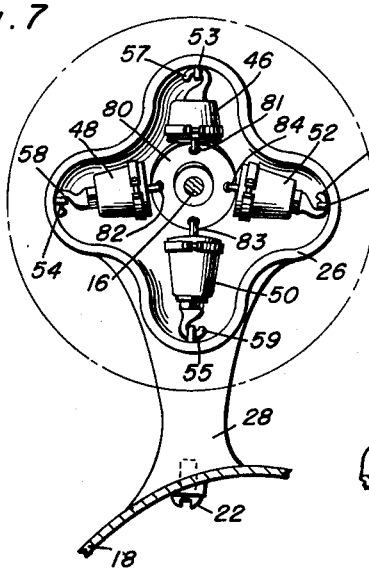
Figure 7 is a transverse sectional view of the accessory of Figure 1.
Figure 8:
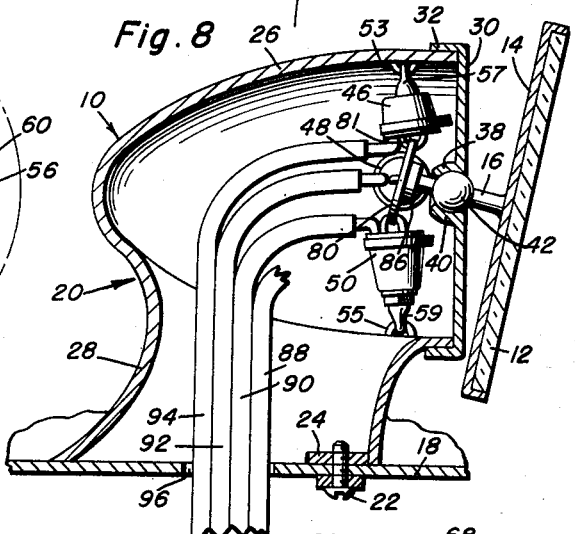
Figure 8 is a longitudinal sectional view in enlarged scale and taken approximately on the line 8—8 of Figure 1.

In the accompanying drawings there is an accessory 10 which exemplifies the principles of the invention. This accessory is a mirror assembly that has a mirror 12 and a mirror holding plate 14, the latter having a lever or arm 16 fixed thereto and protruding from the back face thereof. The accessory 10 is mounted on one fender of the motor vehicle 18, although this accessory may be mounted at any place considered reasonable and practical in accordance with the desires of the manufacturer or the owner.

A mount 20 for the mirror 12 is attached to the motor vehicle. Although various expedients may be resorted to in attaching the mount 20 to the motor vehicle 18, bolt 22 is shown, this bolt schematically representing a suitable means for accomplishing this end. The bolt passes through a cross member 24 of the mount 20, the latter being a hollow casing 26 that has a hollow support 28 that is so shaped as to fit the contours of the motor vehicle body on which it is mounted. A gasket may be used and other common expedients resorted to in the mounting of the accessory 10. A front plate 30 is secured on the housing 26, there being a flange 32 along its outer edge that embraces the open front of the housing.

A ball joint connection 38 is used for mounting the mirror 12 in place and in such a manner that it is capable of swivel movement. The ball joint 38 consists of a socket 40 that is formed in plate 30 and a ball 42 that is mounted swivelly therein. The ball is attached to or formed on arm or lever 16 and is located intermediate the ends thereof. One end of arm 16 is fixed to the mirror mounting plate 14 while the other end of the arm protrudes into the interior of mount 20.

Four vacuum motors 46, 48, 50 and 52 respectively are attached in quadrature to the mount 20 and specifically, to four eyes 53, 54, 55 and 56 respectively on the inner surface of housing 26. The motors have hooks 57, 58, 59 and 60 that are engaged with the eyes in order to anchor the outer ends of each of the motors to the housing 26.

Figure 9:
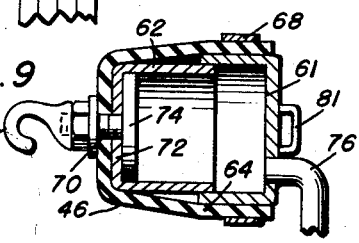
Figure 9 is a longitudinal sectional view of one of the fluid motors that forms a part of the invention.

A typical motor 46 is shown in Figure 9. It comprises two cylinders 61 and 62 respectively, the cylinders being telescopingly arranged with respect to each other. A resilient cover 64 is on the cylinders 61 and 62 and is held in place by a band 68 that encircles cylinder 61 near an end thereof. This band is pulled tight by a bolt that passes through aligned openings in a pair of ears thereon. Hook 57 on motor 46 has a bolt 70 at one end that is passed through an opening in cover 64 and threaded in a tapped opening in the end wall 72 of cylinder 62. Alternatively, bolt 70 may be a stud with an enlarged head 74 thereon, to the outer extremity of which the hook 57 is engaged as by being threaded thereon. Cylinder 62 is movable with respect to cylinder 61 by the application of the vacuum through vacuum line 76. This vacuum line is a small pipe that is soldered or otherwise connected to the cylinder 61, the pipe having its bore exposed to the interior of the telescopingly arranged cylinders 61 and 62.

Figure 10:
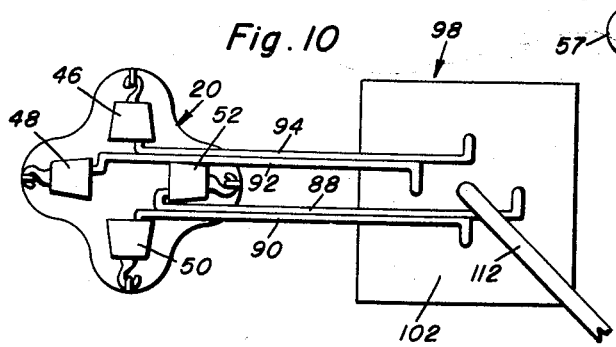
Figure 10 is a schematic view showing the connection between the valve and the fluid motors which are used to tilt the mirror in accordance with the needs or desires of the motorist.

A plate 80 is mounted within the housing 26 and has four apertures near its edge. The apertures are approximately 90° removed from each other and each has one of the loops 81, 82, 83 and 84 respectively in it, these loops being on the four motors 46, 48, 50 and 52 respectively. Plate 80 has a collar 86 attached to it, the latter being fixed on the inner end of lever or arm 16. Four conduits 88, 90, 92 and 94 are passed through an opening 96 in the motor vehicle body, fender or other part on which the accessory 10 is mounted. These conduits are attached to the four pipes of the vacuum motors 46, 48, 50 and 52. The conduits are preferably flexible for ease of installation and economy. As shown schematically in Figure 10, they extend to a valve 98 that is located remotely from the accessory mount 20.

Valve 98 is adapted to be mounted on the instrument panel 100 or other location convenient to the motor vehicle operator. It consists of a valve plate 102 that has four openings 103, 104, 105 and 106 respectively extending therethrough. Four pipes such as those at 107 and 108 are fixed to the plate 102 and in registry with the openings. Openings 103, 104, 105 and 106 are arranged in quadrature in valve plate 102, and the four conductors 88, 90, 92 and 94 extend from the four pipes for ultimate connections to the four motors 46, 48, 50 and 52 respectively. A central opening 110 is formed in plate 102 and has a pipe 111 connected with it. A source of vacuum in the motor vehicle, for example in the intake manifold or carburetor is tapped and the conduit 112 connected with it. This conduit attaches to the pipe 111 so that the opening 110 is always exposed to a vacuum so long as the motor vehicle engine is in operation.

A casing having sides 114, 116, 118 and 120 is attached to the valve plate 102. Sliding valve block 124 is mounted on a surface of valve plate 102. Valve block 124 has a rib 126 extending thereacross, this rib accommodating stud 128 that is threaded therein. Crossed channels 130 and 132 are formed in the sliding block 124 and they are adapted to be in registry with vacuum opening 110 (Figure 3). In addition they are adapted to be brought into registry with a selected opening 103, 104, 105 or 106 depending upon which vacuum motor is to be actuated. Four vent openings 136, 138, 140 and 142 are formed in the sliding block 124 and they are brought into registry with selected openings 103, 104, 105 and 106 depending upon the position of the sliding block 124. The purpose of bringing the vent openings into registry with one of the openings in the valve plate 102 is to open the fluid motor to the surrounding atmospheric pressure.

Sliding block 124 is arranged in the center of plate 102 and is held there yieldingly by means of four springs 148, 149, 159 and 152 respectively. These springs are arranged at right angles to each other and have their outer ends attached to hooks on the sides 116, 114, 120 and 118 of the housing 156 that was mentioned previously. The inner ends of the four springs are engaged in apertures in plate 160, the latter being held fixed to the sliding block 124 by the stud 128. The head of stud 128 is located in the end of bore 164, this bore being in a small handle 166. The handle protrudes through the front wall 168 of housing 156 and through an opening in the face plate 170 that is adapted to be mounted on the instrument panel 100. A ball 172 is formed on the handle 166 and abuts a socket 174 that is formed in a plate 176, the latter having a flange which abuts the inner surface of wall 168. A spring 180 contacts ball 172 and pushes the handle 168 outwardly in order that there will be a firm sliding fit of the ball 172 on its socket 174. The opposite end of this spring 180 seats upon the plate 160 (Figure 3).

In use on a motor vehicle, for example an automobile or truck, the mount 20 is attached at any place desired by the manufacturer or owner. Valve 98 is also attached to a part of the motor vehicle, preferably within the convenient reach of the motorist. After the conduits 88, 90, 92 and 94 are connected to the valve and to the vacuum motors and the engine of the motor vehicle is started, mirror 12 may be adjusted by the motorist from his seat. If he desires to tilt the mirror so that he will see lower images behind him by peering into the mirror, he moves the handle 166 downwardly. When this happens (see Figure 3) the stud 128 is moved upwardly inasmuch as the head 190 thereof is disposed in the end of bore 164. Accompanying the upward motion of stud 128 is an upward movement of sliding block 124 on the front surface of plate 102. The side openings 138 and 142 of sliding block 124 are removed from openings 104 and 106 (see Figure 5) and the opening 136 in sliding block 124 is separated from opening 103 (Figures 3 and 5). However, the vent opening 140 is brought in registry with opening 105 in place 102. Any vacuum in motor 50 with which opening 105 is in registry through conduit 90, is relieved by being exposed to the ambient pressure. Crossed channels 130 and 132 are also separated from all of the openings except one. This condition is seen in Figure 5 where the crossed channels are seen to be in registry with opening 103 and plate 102 so that suction may be applied to conduit 94 and ultimately to the motor 46 through the crossed channels, opening 110 and conduit 112 that attaches to the source of vacuum. Inasmuch as motor 46 is exposed to the vacuum the telescopically arranged cylinders are drawn together thereby tilting arm 16 about its ball joint. This tilting movement is accomplished by a corresponding tilting movement of the mirror 12.

When it is desired to move the mirror either to the left or to the right or downwardly handle 46 is moved in the same direction as desired for movement of mirror 12. In so doing a corresponding movement of sliding block 124 is achieved. When this sliding block is at the rest position, which is the normal position inasmuch as the four springs 148, 149, 150 and 152 return the handle 166 to the rest position after the motorist removes his fingers therefrom, no vacuum is applied to any of the conduits inasmuch as the crossed channels have a normal rest position in registry with none of the openings 103, 104, 105 and 106.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an accessory for a motor vehicle that has a source of vacuum, a mirror, a mount, a swivel constructed of a fixed and a movable member connecting said mirror to said mount, an arm protruding from said movable member, vacuum operated means connected to said arm for swivelling said arm in order to thereby move said mirror, a control that includes a valve having a handle protruding therefrom, means interconnecting said control with said arm moving means, said control handle being movable in a direction which corresponds to the desired direction of movement of said mirror, said control including a stationary valve plate having a plurality of openings, a sliding block having channels and vent openings, said channels and vent openings being selectively registrable with openings in said valve plate, and means drivingly connecting said handle to said sliding block for movement of the latter in response to movement of the handle.

2. The combination of claim 1 together with resilient means carried by said mount and operatively connected with said sliding block for opposing the movement of said sliding block in all directions and for returning said sliding block to an initial starting position.

3. The combination of claim 2 wherein said means for moving said arm includes four vacuum motors, each of said motors being attached to said mount, means individually connecting each of said motors to said arm, and conduits connecting said motors and said openings in said stationary valve plate.

4. An accessory for an automobile, truck and the like that is mounted on the exterior thereof, said accessory including a mirror, four motors mounted at right angles to each other, a mount to which said motors are attached, an arm to which the mirror is secured, means mounting said arm for movement on said mount so that the mirror may be tilted to various positions, means connecting said four motors to said arm in order to tilt the latter and thereby tilt said mirror, means connected to said motors and located remotely therefrom for actuating selective ones of said motor, said connecting means including a multiple valve, conduits extending from said multiple valve to said individual motors, a conduit, and a source of vacuum attached through said conduit to said multiple valve in order to be brought into registry with selected conduits which lead to selected ones of said motors.

References Cited in the file of this patent
UNITED STATES PATENTS

| | | |
|---|---|---|
| 1,542,259 | Macy | June 16, 1925 |
| 1,630,217 | Rasor | May 24, 1927 |
| 2,198,965 | Habig et al. | Apr. 30, 1940 |
| 2,297,610 | De Giers | Sept. 29, 1942 |
| 2,373,745 | Conway | Apr. 17, 1945 |
| 2,545,258 | Cailloux | Mar. 13, 1951 |
| 2,656,764 | Johnson | Oct. 27, 1953 |
| 2,713,810 | Hill | July 26, 1955 |